July 8, 1952 R. J. LENSE ET AL 2,602,852

SELECTIVE CALLING SYSTEM

Original Filed May 23, 1947

*INVENTORS*
Ralph J. Lense
*BY* Alfred S. Holzinger

Foorman L. Mueller
Atty.

Patented July 8, 1952 2,602,852

UNITED STATES PATENT OFFICE 2,602,852

SELECTIVE CALLING SYSTEM

Ralph J. Lense, Deerfield, and Alfred S. Holzinger, Chicago, Ill., assignors to Motorola, Inc., Chicago, Ill., a corporation of Illinois Original application May 23, 1947, Serial No. 749,952, now Patent No. 2,547,023, dated April 3, 1951. Divided and this application August 11, 1950, Serial No. 178,916

10 Claims. (Cl. 177—353)

This invention relates generally to frequency responsive systems and more particularly to a selective calling system for use with radio equipment. This application is a division of application Serial No 749,952, filed May 23, 1947, now Patent No. 2,547,023, issued April 3, 1951.

In radio installations wherein a plurality of remote stations are used and it is desired to communicate from a central station to one or more of said remote stations, some system is required for signaling the remote station or stations to be contacted. Radio communication systems used by mobile police officers is an example of such a system. The required signaling may be provided by visual or audible signals to notify the called operator that a message is about to be transmitted to him, or alternatively the calling system may automatically condition the receiver of the party to be contacted for operation so that the message will be translated by his receiver only. Although various calling systems have been provided of both the above types, these systems have been relatively complicated and consequently quite expensive. Such systems have in general been patterned after telephone selector equipment which is adapted for use in fixed installations. Therefore, the equipment is not particularly adapted to vehicular installations as is generally required in mobile radio stations.

A suitable selective calling system for mobile use should be of the automatic type, it should be fast in operation and of simple construction so that it may be inexpensively produced. The system should be capable of being actuated by signals provided over the normal voice channel which are of no greater amplitude than the voice signals. Also it is necessary that such a system be capable of providing a relatively large number of different calls. This, of course, depends upon the number of stations in the system and, for example, for police use, would depend upon the size of the city and, therefore, the number of vehicles to be equipped. To cover most presently known applications, systems capable of making from 25 to a maximum of about 400 calls would appear to take care of all requirements.

It is, therefore, an object of the present invention to provide a simple selective calling system which is extremely fast in operation.

It is another object of this invention to provide a selective calling system which is simple and inexpensive and still dependable in operation, and which is capable of providing a large number of different calls.

It is a further object of this invention to provide a selective calling system which operates from signals provided on the normal voice channel and in which the system will be operated by signals of no greater magnitude than said voice signal.

A still further object of this invention is to provide a selective calling system operating on calling signal transmitted on the voice channel at a relatively low level and which discriminates against voice, music and noise signals on said channel.

A still further object of this invention is to provide a selective calling system which responds when signals of a particular frequency are applied thereto and which has a high discrimination against voice, noise and music which include random signals of the particular frequency.

A feature of this invention is the provision of a selective calling system utilizing electromechanical contactors which respond to particular frequencies for conditioning the system for operation when signals of the particular frequencies are simultaneously applied to the contactors.

A further feature of this invention is the provision of a selective responsive device having a pair of vibratory contactors which are responsive to frequencies which differ only slightly and arranged so that when a noise signal including both frequencies is applied thereto both contactors are operated and the system does not respond, but when a signal including only one of said frequencies is applied the system does respond.

Further objects, features and advantages will be apparent from a consideration of the following description taken in connection with the accompanying drawings in which.

In practicing the invention there is provided a selective responsive device including a plurality of electromechanical contactors each having a resonant frequency at which is responds. One of the contactors is connected in a circuit with a condenser and a source of voltage so that when a signal of the proper frequency is applied thereto, the contactor will close the circuit to charge the condenser. The voltage developed across the condenser may be used to actuate controls in various ways such as, for example, to provide a bias for a vacuum tube to cause it to conduct and actuate a relay for switching control circuits. An auxiliary electromechanical contactor responsive to a frequency differing slightly from the frequency to which the system is intended to respond is also connected to the condenser for discharging the same. This provides discrimination against noise signals as noise which includes the calling frequency will normally include other adjacent frequencies and the condenser will not be charged because of the discharging action of the auxiliary contactor.

Figure 1:
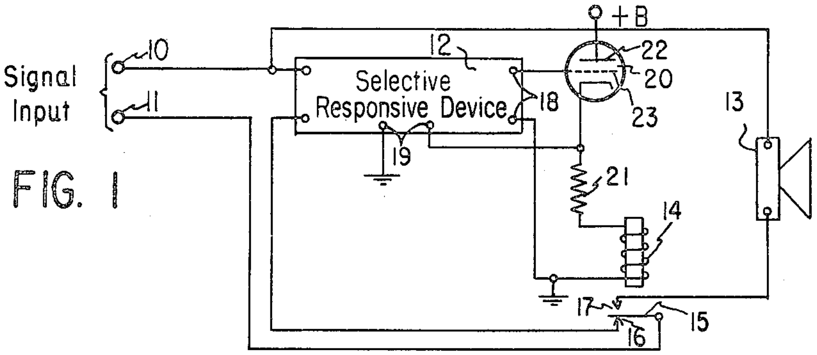
Fig. 1 illustrates a typical selective calling system in accordance with the invention.

Referring now to the drawings, in Fig. 1 there is illustrated a calling system having input terminals 10 and 11 adapted to be connected to any signal source which includes voice signals and calling signals. The signal source may, for example, be a radio receiver or a wire line. The input terminal 10 is connected to a selective responsive device 12 and to a sound reproducing device 13. The terminal 11 is connected to the movable contact 15 of relay 14 which includes fixed contacts 16 and 17 connected to the selective responsive device 12 and the sound reproducing device 13, respectively, so that operation of the relay causes the input to be switched from one of these devices to the other. It is apparent that the selective responsive device can be connected directly to the terminals 10 and 11 and only the sound reproducing device switched by the relay. In this case contact 16 is not required on the relay. The selective responsive device 12 may take various forms as will be hereinafter described but in all instances will be a device adapted to produce a predetermined output voltage when signals of predetermined frequencies are applied thereto, the output voltage appearing at terminals 18. Terminals 19 are provided on the device to which a direct current exciting voltage is applied.

For the purpose of operating the relay 14, the terminals 18 and 19 of the selective responsive device are connected in a circuit including tube 20, resistor 21 and the relay 14. It will be apparent from Fig. 1, that when a +B potential is applied to the plate 22 of the tube 20 a portion of this voltage will appear across the winding of the relay 14 and resistor 21 and will, therefore, be applied to terminals 19. The voltage appearing at terminals 18 of the selective responsive device 12 is applied to the grid 23 of the tube 20 and when a predetermined voltage is reached the output current of the tube will be such that the relay 14 will actuate causing the movable contact 15 thereof to connect the loud speaker to the signal circuit. It is apparent that the operation of the circuit will depend upon the value of resistor 21 and the characteristics of the relay 14, the tube 20 and the selective responsive device 12.

Figure 2:
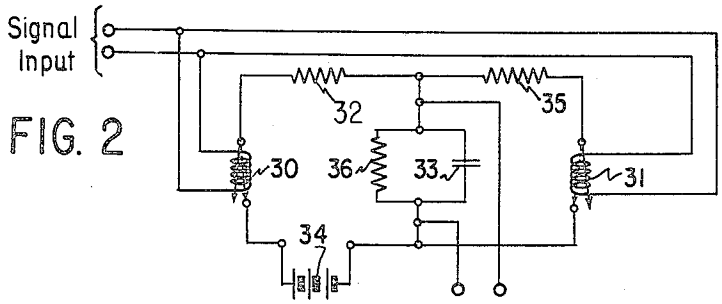
Fig. 2 is a circuit diagram of one embodiment of a selective responsive device in accordance with the invention.

In Fig. 2 there is illustrated a selective responsive device operated by a single tone but arranged to provide high discrimination against signals including the particular tone and other tones of substantially the same frequency. The device includes a pair of contactors connected in parallel with respect to the main condenser across which the control voltage is built up. These contactors are indicated at 30 and 31 with the contactor 30 being connected in series with resistor 32, condenser 33, and voltage source 34, and the contactor 31 being connected in series with resistor 35 across the condenser 33. The resistor 36 is connected in parallel with condenser 33 to gradually discharge the same to impart a time constant to the system. The contactors 30 and 31 are selected to be responsive to slightly different frequencies which are sufficiently close so that if one frequency is present in voice, noise or music, the other frequency would in most cases also be present.

It is apparent from an examination of Fig. 2 that intermittent closing of contactor 30 will cause the condenser 33 to be intermittently connected across the voltage source 34 to be charged thereby. Also, closing of the contactor 31 will cause the condenser 33 to be discharged through resistor 35. By properly selecting the values of the resistors 32 and 35, the device can be arranged so that the condenser 33 will not become charged when the two contactors operate simultaneously. However, it is apparent that operation of the contactor 30 alone will cause the condenser 33 to become charged. Therefore, when a calling signal of the frequency to which contactor 30 is responsive is applied to the device, a voltage will be built up on condenser 33 which can be used in a selective calling system as, for example, in the system of Fig. 1. The system of Fig. 2 is, of course, limited as to the number of calls to which it is responsive by the number of different contactors used. When using reeds as previously described which are available in ten different frequencies, only ten calls are available in this system. The contactor 31 is not effective to provide additional calls but provides discrimination against noise resulting in a very good system where only a small number of stations are required.

Figure 3:
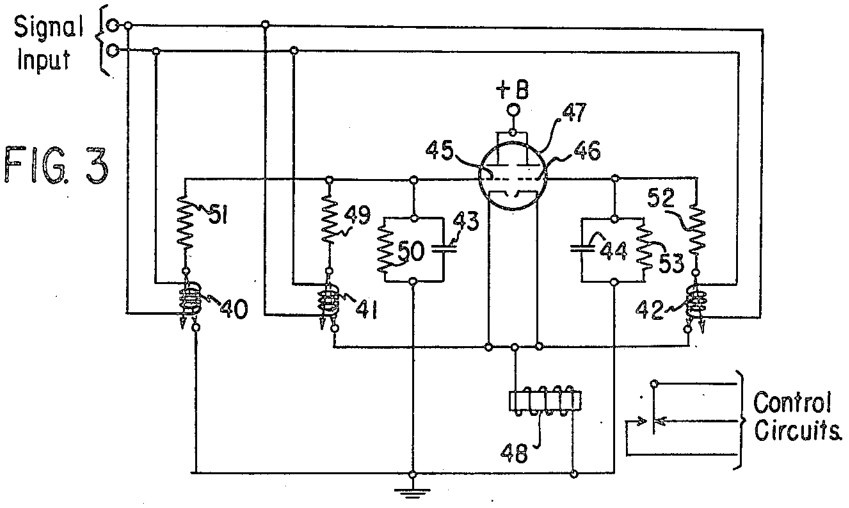
Fig. 3 illustrates a modified selective responsive device in accordance with the invention.

Fig. 3 illustrates a selective responsive device which utilizes the general principles of the device of Fig. 2 and is made more selective by the addition of another electromechanical contactor. This device includes contactors 40, 41 and 42, the contactors 40 and 41 being in a circuit including condenser 43 and the contactors 42 being in a circuit including condenser 44. The condensers 43 and 44 are connected to the grids 45 and 46, respectively, of two triode sections included in a single tube 47. The output circuits of the triodes are connected in parallel so that the combined output current therefrom is applied to the winding 48 of a relay. The application of +B voltage to the plates of the triodes will produce a voltage across the winding 48 which is used to charge the condensers 43 and 44 as will be described. The two triode sections in the normal condition will provide a current through the relay winding 48 sufficient to produce a voltage thereacross for charging the condensers 43 and 44. However, sufficient current is not provided to cause the relay to operate until the triode sections are both fully conducting.

The contactor 41 is connected in series with the winding 48, condenser 43 and a resistor 49 so that closing of the contactor 41 charges the condenser 43 from the voltage appearing across the winding 48. As in prior modifications, a resistor 50 is provided across the condenser 43 of such value to give the circuit the desired time constant. The contactor 40 in series with resistor 51 is connected directly across the condenser 43 so that closing of the contactor 40 discharges the condenser 43 through the resistor 51. Therefore, the contactors 40 and 41 operate in the same manner as the contactors 30 and 31 of Fig. 2 and are selected to be responsive to slightly different frequencies so that both will normally be actuated by noise, voice and music signals and only contactor 41 will be actuated by the calling signal. The contactor 42 is connected in series with the winding 48, condenser 44 and resistor 52 to charge condenser 44 from the voltage across the winding 48, and resistor 53 is provided in parallel with condenser 44 for the reasons previously described. The contactor 42 is selected to be responsive to a calling signal of a frequency differing from that of contactors 40 and 41, and will accordingly be set in motion by this frequency either when received as a part of a noise signal or as a calling signal.

To arrange the system so that it will respond only when a calling signal including the natural frequencies of contactors 41 and 42 is applied, the relay 48 must have such characteristics that plate current from both triode sections will be required to provide sufficient current for actuating the same. When calling signals including these frequencies are then applied, the contactors 41 and 42 will operate causing the condensers 43 and 44 to be charged to provide the voltage required to bias the triode sections so that both sections will conduct. The combined current of the two sections will then be applied to the winding 48 of the relay causing the relay to be actuated. It is seen from the above that charging of either condenser 43 or 44 alone will not cause actuation of the relay but simultaneous charging of both condensers is necessary for this operation. It is, therefore, seen that the contactor 40 which tends to prevent charging of the condenser 43 in the presence of noise will provide high noise discrimination for this system. The contactor 42 will further provide noise discrimination as the likelihood is not great that noise signals will include the frequencies for actuation of both contactors 41 and 42. The contactor 42 further requires a particular signal for actuating the device to thereby increase the number of calls which can be provided. That is, contactors responsive to various frequencies can be used for the two contactors 41 and 42 so that when using vibratory reeds available in ten different frequencies a total of forty-five calls are possible by using a combination of any two of these reeds at a time.

It will be apparent that the selective responsive devices of Figs. 2 and 3 are not limited in application to a simple selective calling system as illustrated in Fig. 1 but may be used in other types of selective calling systems or in various other types of control systems. For example, the selective responsive device can be used in a selective control system wherein one signal is applied for actuating a control and a second signal is used for disengaging the control.

From the above description it is apparent that we have provided frequency responsive devices which are of simple and inexpensive construction and which are suitable for use in selective calling systems as required for a mobile station in a radio communication network. These calling systems have been found to be highly selective and to provide dependable service. The calling system in accordance with the invention is adapted to be constructed as a small and rugged unit as is required for vehicular use.

Although we have described certain embodiments of our invention, it is apparent that various changes and modifications can be made therein without departing from the intended scope of the invention as defined in the appended claims.

We claim:

1. A selective responsive system including an electromechanical contactor adapted to be actuated by a signal of a first frequency, a second electromechanical contactor adapted to be actuated by a signal of a second frequency differing slightly from said first frequency, a capacitor, a source of voltage, said first contactor being adapted upon application of a signal of said first frequency thereto to connect said capacitor to said voltage source to charge said capacitor to a voltage approximately equal to that of said voltage source, said second contactor being adapted upon application of a signal of said second frequency thereto to discharge said capacitor, so that application of said first frequency to said contactors alone causes said capacitor to become charged and application of signals at random including signals of said first and second frequencies to said contactors causes said capacitor to be intermittently discharged preventing the building up of a large charge on said capacitor.

2. A selective responsive system including an electromechanical contactor adapted to be actuated by a signal of a first frequency, a second electromechanical contactor adapted to be actuated by a signal of a second frequency, a capacitor, a source of voltage, said first contactor being adapted upon application of a signal of said first frequency thereto to connect said capacitor to said voltage source to charge said capacitor, said second contactor being adapted upon application of a signal of said second frequency thereto to discharge said capacitor, so that application of said first frequency alone to said contactors causes said capacitor to become charged and application of random signals including signals of said second frequency to said contactors prevents said capacitor from becoming substantially charged.

3. A selective responsive system including a first electromechanical contactor responsive to a signal of a first frequency, a second electromechanical contactor responsive to a signal of a second frequency differing slightly from said first frequency, a parallel circuit including a capacitor and a resistor, a source of voltage, said first contactor being connected to said parallel circuit and to said voltage source for charging said capacitor to a voltage approximately equal to that of said source in response to a signal of said first frequency, said second contactor being connected across said parallel circuit to discharge said capacitor in response to a signal of said second frequency, so that application of said first frequency to said contactors alone causes said capacitor to become charged and application of signals at random including signals of said first and second frequencies to said contactors causes said capacitor to be intermittently discharged, said first contactor and said resistor cooperating to prevent the building up of a large charge on said capacitor by the action of random signals.

4. A selective responsive system including a first electromechanical frequency selective device responsive to a signal of a first frequency, a second electromechanical frequency responsive device responsive to a signal of a second frequency differing slightly from said first frequency, a capacitor, a source of voltage, said first frequency selective device connecting said capacitor to said voltage source to charge said capacitor to a voltage approximately equal to that of said voltage source in response to a signal of said first frequency, said second frequency selective device being connected across said capacitor to discharge the same in response to a signal of said second frequency, so that application of said first frequency alone to said devices causes said capacitor to become charged and application of signals at random including signals of said first and second frequencies to said devices causes said capacitor to be intermittently discharged preventing the building up of a large charge on said capacitor.

5. A selective responsive system including a first electromechanical frequency selective device responsive to a signal of a first frequency, a second electromechanical frequency selective device responsive to a signal of a second frequency, a capacitor, a source of voltage, said first frequency selective device being adapted upon application of a signal of said first frequency thereto to charge said capacitor from said voltage source, said second frequency selective device being adapted upon application of a signal of said second frequency thereto to discharge said capacitor, so that application of said first frequency alone to said devices causes said capacitor to become charged and application of random signals including signals of said second frequency to said devices prevents said capacitor from becoming substantially charged.

6. A selective responsive system including first and second electromechanical frequency selective devices responsive to signals of predetermined frequencies, means applying signals to said devices, first and second condensers, first and second electron discharge valves having input and output electrodes, a source of voltage, first and second circuits each including one of said devices, one of said condensers and said input electrode of one of said valves for charging said condensers in response to signals of the frequency to which said devices are individually responsive and for rendering said valves conducting when the associated condenser is changed, a relay connected to said output electrodes of said first and second valves and operated when said first and second valves are simultaneously rendered conducting, and at least one additional electromechanical frequency selective device responsive to a signal of a frequency differing only slightly from the frequency of one of said first and second devices, said additional device being connected across said condenser in circuit with the said one of said devices for discharging the same.

7. A selective responsive system including first and second electromechanical frequency selective devices responsive to signals of predetermined frequencies, first and second condensers, first and second electron discharge valves having input and output electrodes, a source of voltage, a first circuit including said first device, said source of voltage, said first condenser, and said input electrodes of said first valve for rendering said first valve conducting in response to a signal of the frequency to which said first device is responsive, a second circuit including said second device, said source of voltage, said second condenser and said input electrodes of said second electron discharge valve for rendering said second valve conducting in response to a signal of the frequency to which said second device is responsive, a relay connected to said output electrodes of said first and second valves and operated when said first and second valves are simultaneously rendered conducting, and at least one additional electromechanical frequency selective device connected across one of said condensers for discharging the same, said additional device being responsive to a signal of a frequency differing only slightly from the frequency of the device in circuit with said one condenser.

8. A selective responsive system including first and second electromechanical frequency selective devices responsive to signals of predetermined frequencies, first and second condensers, first and second electron discharge valves having input and output electrodes, a source of voltage, a first circuit including said first device, said source of voltage and said first condenser connected in series for charging said first condenser in response to a signal of the frequency to which said first device is responsive, said first circuit also including means connecting said first condenser to said input electrodes of said first valve for rendering said first valve conducting when said condenser is changed to a predetermined value, a second circuit including said second device, said source of voltage and said second condenser connected in series for charging said second condenser in response to a signal of the frequency to which said second device is responsive, said second circuit also including means connecting said second condenser to said input electrodes of said second electron discharge valve for rendering said second valve conducting when said condenser is charged to a predetermined value, control means connected to said output electrodes of said first and second valves and operated when said first and second valves are simultaneously rendered conducting, and at least one additional electromechanical frequency selective device connected across one of said condensers for discharging the same, said additional device being responsive to a signal of a frequency differing only slightly from the frequency of the device in circuit with said one condenser.

9. A selective responsive system including first and second electromechanical frequency selective devices responsive to signals of predetermined frequencies, first and second condensers, first and second electron discharge valves having input and output electrodes, a source of voltage, a first circuit including said first device, said source of voltage and said first condenser connected in series for charging said first condenser in response to a signal of the frequency to which said first device is responsive, said first circuit also including means connecting said first condenser to said input electrodes of said first valve for rendering said first valve conducting when said condenser is changed to a predetermined value, a second circuit including said second device, said source of voltage and said second condenser connected in series for charging said second condenser in response to a signal of the frequency to which said second device is responsive, said second circuit also including means connecting said second condenser to said input electrodes of said second electron discharge valve for rendering said second valve conducting when said condenser is charged to a predetermined value, and control means connected to said output electrodes of said first and second valves and operated when said first and second valves are simultaneously rendered conducting.

10. A selective responsive system including first and second electromechanical frequency selective devices responsive to signals of predetermined frequencies, means applying signals to said devices, first and second condensers, first and second electron discharge valves having input and output electrodes, a source of voltage, first and second circuits each including one of said devices, one of said condensers and said input electrode of one of said valves for charging said condensers in response to signals of the frequency to which said devices are individually responsive and for rendering said valves conducting when the associated condenser is changed, and a relay connected to said output electrodes of said first and second valves and operated when said first and second valves are simultaneously rendered conducting.

RALPH J. LENSE.
ALFRED S. HOLZINGER.

No references cited.